United States Patent
Bian

(10) Patent No.: US 11,803,010 B2
(45) Date of Patent: Oct. 31, 2023

(54) OPTICAL COUPLERS WITH DIAGONAL LIGHT TRANSFER

(71) Applicant: GlobalFoundries U.S. Inc., Malta, NY (US)

(72) Inventor: Yusheng Bian, Ballston Lake, NY (US)

(73) Assignee: GlobalFoundries U.S. Inc., Malta, NY (US)

( * ) Notice: Subject to any disclaimer, the term of this patent is extended or adjusted under 35 U.S.C. 154(b) by 0 days.

(21) Appl. No.: 17/524,218

(22) Filed: Nov. 11, 2021

(65) Prior Publication Data

US 2023/0143832 A1    May 11, 2023

(51) Int. Cl.
| | |
|---|---|
| *G02B 6/00* | (2006.01) |
| *G02B 6/26* | (2006.01) |
| *G02B 6/42* | (2006.01) |
| *G02B 6/10* | (2006.01) |
| *G02B 6/122* | (2006.01) |
| *G02B 6/12* | (2006.01) |
| *G02B 6/125* | (2006.01) |

(52) U.S. Cl.
CPC ....... *G02B 6/1228* (2013.01); *G02B 6/12002* (2013.01); *G02B 6/125* (2013.01)

(58) Field of Classification Search
CPC .. G02B 6/1228; G02B 6/12002; G02B 6/125; G02B 6/136; G02B 6/12004; G02B 6/124; G02B 2006/12061; G02B 2006/12147
USPC ............. 385/13–15, 30–32, 43, 50, 129–132
See application file for complete search history.

(56) References Cited

U.S. PATENT DOCUMENTS

| | | | |
|---|---|---|---|
| 6,920,266 B2* | 7/2005 | Blume | G02B 6/1228 385/28 |
| 10,429,582 B1 | 10/2019 | Bian et al. | |
| 11,029,465 B1 | 6/2021 | Rakowski et al. | |
| 11,125,944 B2 | 9/2021 | Bian et al. | |
| 11,150,407 B2 | 10/2021 | Bian et al. | |
| 2008/0193079 A1* | 8/2008 | Cheben | G02B 6/14 385/28 |

OTHER PUBLICATIONS

Shang, Kuanping et al., "Low-loss compact multilayer silicon nitride platform for 3D photonic integrated circuits," vol. 23, No. 16, DOI:10.1364/OE.23.021334 Optics Express 21334, 9 pages (Aug. 6, 2015).

Sacher, Wesley D. et al., "Monolithically Integrated Multilayer Silicon Nitride-on-Silicon Waveguide Platforms for 3-D Photonic Circuits and Devices," Proceedings of the IEEE, vol. 106, No. 12, pp. 2232-2245 (Dec. 2018).

(Continued)

*Primary Examiner* — Kaveh C Kianni
*Assistant Examiner* — Hung Q Lam
(74) *Attorney, Agent, or Firm* — Thompson Hine LLP; Anthony Canale

(57) ABSTRACT

Structures for an optical coupler and methods of fabricating a structure for an optical coupler. The structure includes a first waveguide core having a first tapered section and a second waveguide core having a second tapered section positioned adjacent to the first tapered section of the first waveguide core. The second tapered section is positioned with a lateral offset in a lateral direction relative to the first tapered section. The second tapered section is positioned with a vertical offset in a vertical direction relative to the first tapered section.

20 Claims, 11 Drawing Sheets

(56) References Cited

OTHER PUBLICATIONS

Yun, Han et al., "2x2 adiabatic 3-dB coupler on silicon-on-insulator rib waveguides," Proceedings of SPIE, vol. 8915, pp. 89150V-1-89150V-6 (2013).
Giewont, Ken et al., "300-mm Monolithic Silicon Photonics Foundry Technology," IEEE Journal of Selected Topics in Quantum Electronics, DOI:10.1109/JSTQE.2019.2908790, vol. 25, No. 5, 8200611, 12 pages (Apr. 2019).
Rakowski, Michal et al., "45nm CMOS-Silicon Photonics Monolithic Technology (45CLO) for next-generation, low power and high speed optical interconnects," OFC 2020, 3 pages (2020).
Bian, Yusheng et al., "Towards low-loss monolithic silicon and nitride photonic building blocks in state-of-the-art 300mm CMOS foundry," Frontiers in Optics/ Laser Science, 2 pages (2020).
Bian, Yusheng et al., "Monolithically integrated silicon nitride platform," TH1A.46 OFC, 3 pages (2021).
Aboketaf, Abdelsalam et al., "Towards fully automated testing and characterization for photonic compact modeling on 300-mm wafer platform," W6A. 1 OFC, 3 pages (2021).
Dezfulian, Kevin K. et al., "Hybrid Edge Couplers With Layers in Multiple Levels" filed on Feb. 8, 2021 as a U.S. Appl. No. 17/169,971.
Bian, Yusheng et al., "Photonic Integrated Circuit Structure With Supplemental Waveguide-Enhanced Optical Coupling Between Primary Waveguides" filed on Aug. 25, 2021 as a U.S. Appl. No. 17/411,106.
Bian, Yusheng et al., "Wavelength Division Multiplexing Filters Including a Subwavelength Grating" filed on Oct. 26, 2021 as a U.S. Appl. No. 17/510,910.

\* cited by examiner

OPTICAL COUPLERS WITH DIAGONAL LIGHT TRANSFER

BACKGROUND

This disclosure relates to photonics chips and, more specifically, to structures for an optical coupler and methods of fabricating a structure for an optical coupler.

Photonics chips are used in many applications and systems including, but not limited to, data communication systems and data computation systems. A photonics chip integrates optical components, such as waveguides, photodetectors, modulators, and optical power splitters, and electronic components, such as field-effect transistors, into a unified platform. Among other factors, layout area, cost, and operational overhead may be reduced by the integration of both types of components on the same chip.

An optical coupler is an optical component used in a photonics chip to transfer optical power from one waveguide core to another waveguide core. An optical splitter, which is a variant of an optical coupler, is used in a photonics chip to divide optical power between waveguide cores with a desired coupling ratio. Conventional optical couplers and optical splitters may have a large footprint, may be wavelength dependent, and may be sensitive to fabrication errors. Conventional optical couplers and optical splitters may also exhibit a high loss. In particular, light of transverse magnetic polarization mode may suffer from a high loss due to an abrupt mode conversion in a conventional optical coupler or optical splitter.

Improved structures for an optical coupler and methods of fabricating a structure for an optical coupler are needed.

SUMMARY

In an embodiment of the invention, a structure for an optical coupler is provided. The structure includes a first waveguide core having a first tapered section and a second waveguide core having a second tapered section positioned adjacent to the first tapered section of the first waveguide core. The second tapered section is positioned with a lateral offset in a lateral direction relative to the first tapered section. The second tapered section is positioned with a vertical offset in a vertical direction relative to the first tapered section.

In an embodiment of the invention, a method of forming a structure for an optical coupler is provided. The method includes forming a first waveguide core that includes a first tapered section, and forming a second waveguide core that includes a second tapered section positioned adjacent to the first tapered section. The second tapered section is positioned with a lateral offset in a lateral direction relative to the first tapered section of the first waveguide core, and the second tapered section is positioned with a vertical offset in a vertical direction relative to the first tapered section of the first waveguide core.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
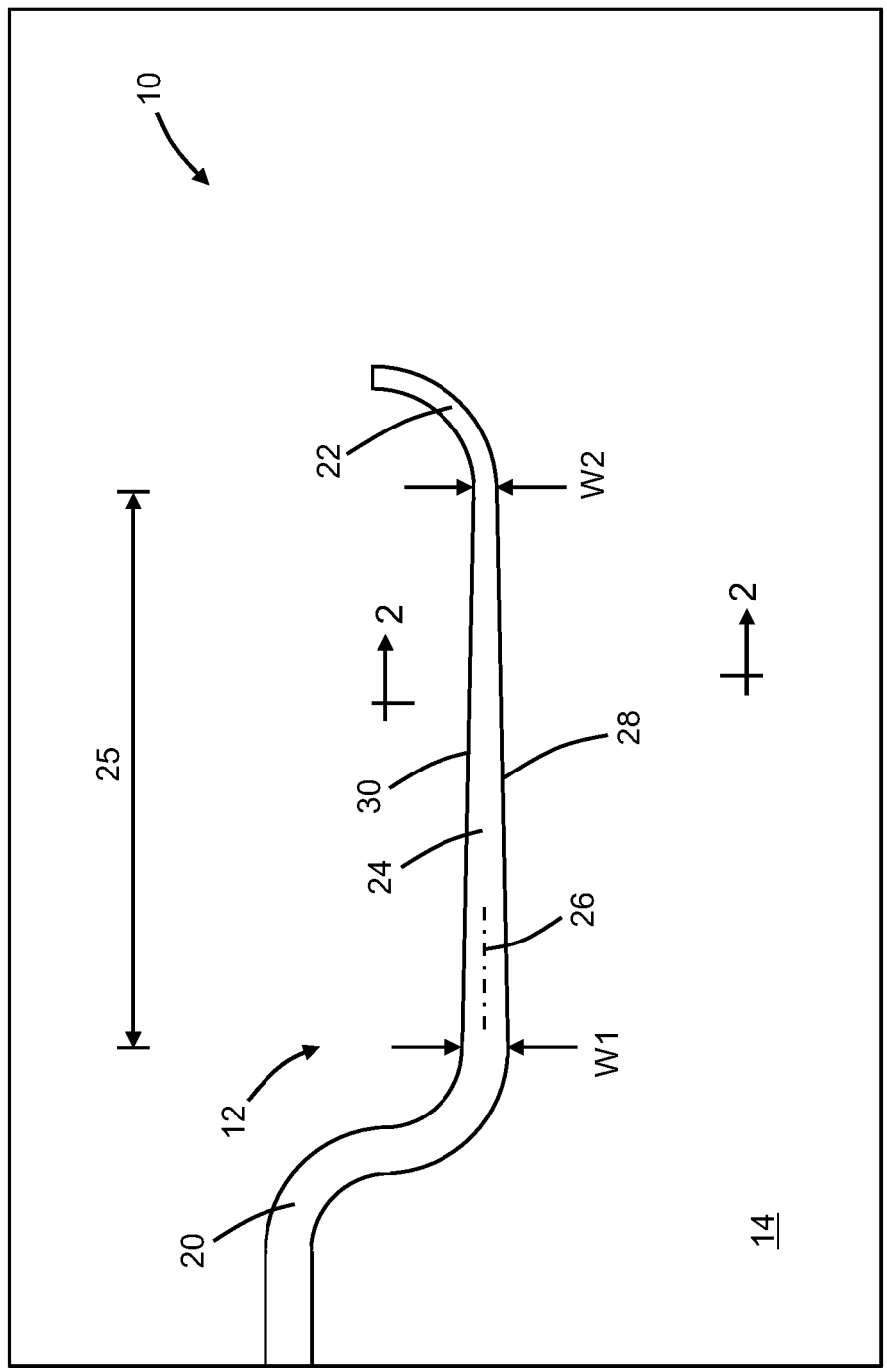
FIG. 1 is a top view of a structure at an initial fabrication stage of a processing method in accordance with embodiments of the invention.
Figure 2:
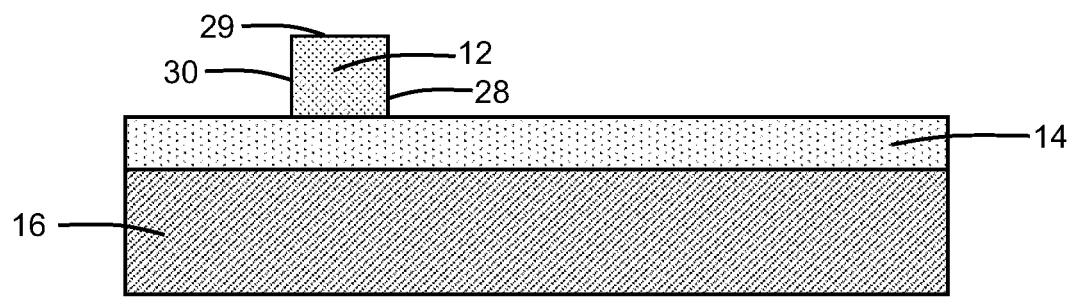
FIG. 2 is a cross-sectional view taken generally along line 2-2 in FIG. 1.

With reference to FIGS. 1, 2 and in accordance with embodiments of the invention, a structure 10 for an optical coupler includes a waveguide core 12 that is positioned over a dielectric layer 14. The waveguide core 12 may be comprised of a high refractive-index material. In an embodiment, the waveguide core 12 may be comprised of a material having a refractive index in a range of 3 to 4. In an embodiment, the waveguide core 12 may be comprised of a semiconductor material, such as single-crystal silicon patterned by lithography and etching processes from a device layer of a silicon-on-insulator substrate. The silicon-on-insulator substrate further includes a buried insulator layer comprised of a dielectric material, such as silicon dioxide, that may provide the dielectric layer 14 and a handle substrate 16 comprised of a semiconductor material, such as single-crystal silicon, beneath the buried insulator layer. In an alternative embodiment, the waveguide core 12 may be patterned from the device layer by lithography and etching processes, without etching fully through the device layer, to form a thinned layer that is connected to the base of the waveguide core 12 and thereby define a ribbed waveguide core instead of a ridge waveguide core.

The waveguide core 12 includes an input section 20, an terminator 22, and a tapered section 24 arranged in an optical path between the input section 20 and the terminator 22. The input section 20 of the waveguide core 12 may include a series of bends that laterally displace the routing of the tapered section 24 of the waveguide core 12. The terminator 22 may include a bend that terminates the waveguide core 12. The tapered section 24, which is aligned along a longitudinal axis 26, has opposite sidewalls 28, 30 and a top surface 29. The tapered section 24, which has a length that extends over a coupling region 25, has a width that varies from a width dimension W1 at an end intersecting the input section 20 to a width dimension W2 at an opposite end intersecting the terminator 22. The width dimensions W1, W2 may differ with the width dimension W1 being greater than the width dimension W2 such that the width decreases with increasing distance from the input section 20. In an embodiment, the width of the tapered section 24 may vary over its length based on a linear function to provide a trapezoidal shape. In an alternative embodiment, the width of the tapered section 24 may vary with a curvature over its length based on a non-linear function, such as a quadratic, cubic, parabolic, sine, cosine, Bezier, or exponential function.

Figure 4:
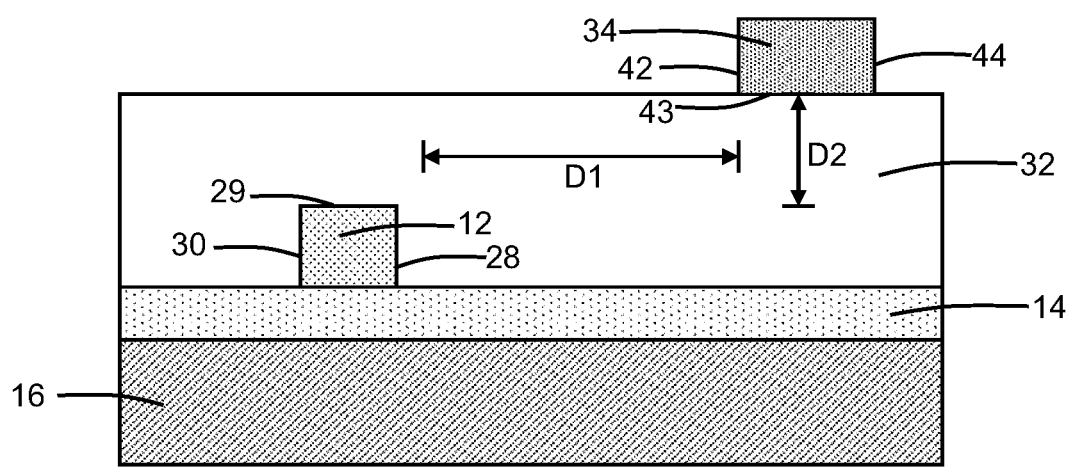
FIG. 4 is a cross-sectional view taken generally along line 4-4 in FIG. 3.
Figure 3:
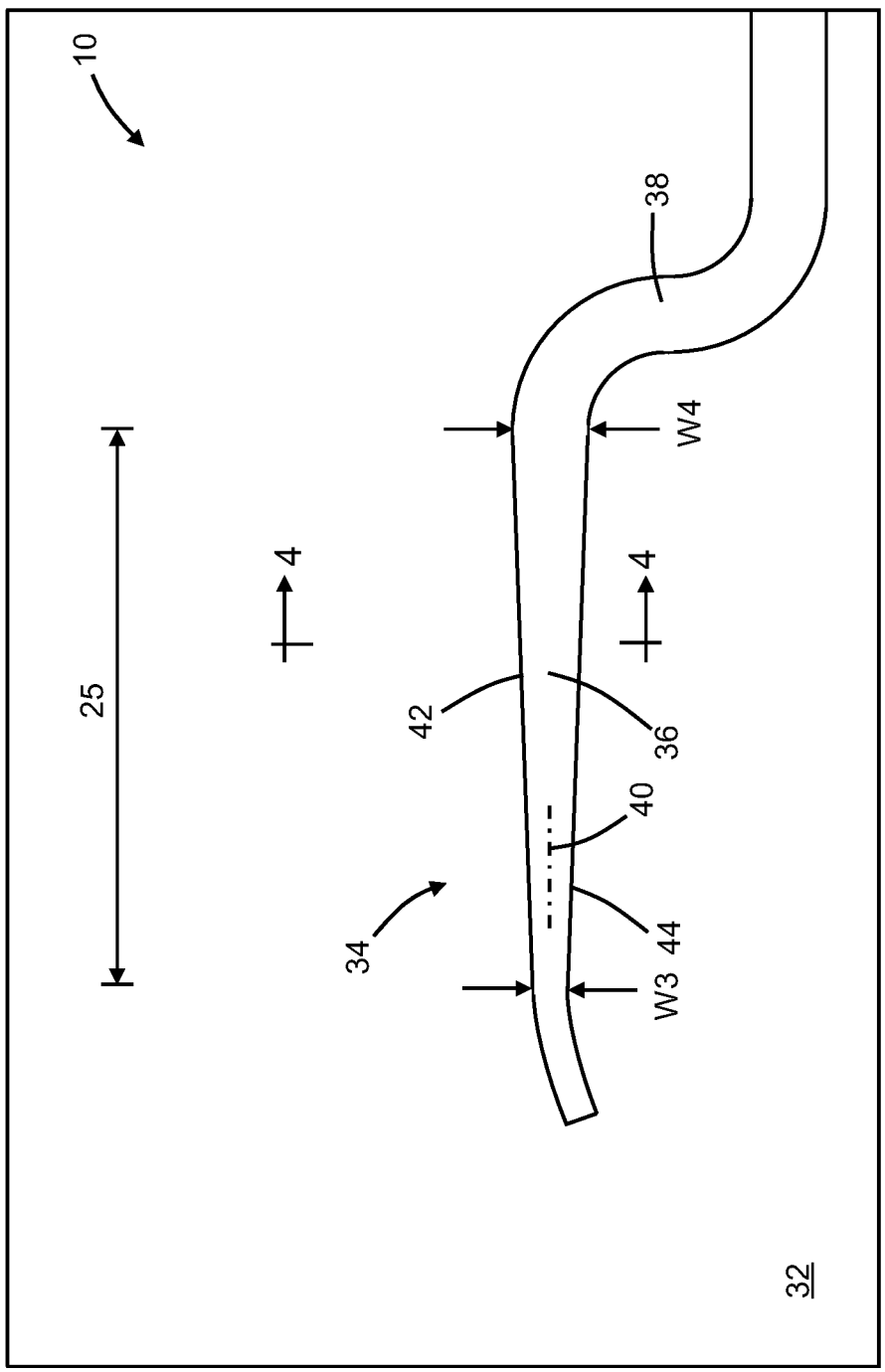
FIG. 3 is a top view of the structure at a fabrication stage subsequent to FIG. 1.

With reference to FIGS. 3, 4 in which like reference numerals refer to like features in FIGS. 1, 2 and at a subsequent fabrication stage, a dielectric layer 32 is formed over the waveguide core 12. The dielectric layer 32 may be comprised of a dielectric material, such as silicon dioxide, that is deposited and then polished to remove topography. The thickness of the dielectric layer 32 may be greater than the thickness of the waveguide core 12 such that the waveguide core 12 is embedded in the dielectric layer 32.

A waveguide core 34 is formed on the dielectric layer 32. The waveguide core 12 and the waveguide core 34 are separated by the dielectric layer 32. The waveguide core 34 may be comprised of a dielectric material, such as silicon nitride, and may have a composition different than the material constituting the waveguide core 12. The waveguide core 34 may be patterned from a deposited layer of the dielectric material by lithography and etching processes. In alternative embodiments, the waveguide core 34 may be comprised of a different dielectric material, such as silicon oxynitride or aluminum nitride. In an alternative embodiment, the waveguide core 34 may be patterned from the deposited layer by lithography and etching processes, without etching fully through the deposited layer, to form a thinned layer that is connected to the base of the waveguide core 34 to define a ribbed waveguide core instead of a ridge waveguide core.

The waveguide core 34 includes a tapered section 36 and an output section 38. The output section 38 of the waveguide core 34 may include a series of bends that laterally displace the routing of the waveguide core 34. The tapered section 36, which is aligned along a longitudinal axis 40, has opposite sidewalls 42, 44 and a bottom surface 43. The longitudinal axis 40 of the tapered section 36 may be aligned parallel to the longitudinal axis 26 of the tapered section 24 (FIG. 1). The tapered section 36 is located adjacent to the tapered section 24 over the coupling region 25, and the dielectric layer 32 is arranged to separate the tapered section 24 from the tapered section 36.

The tapered section 36 of the waveguide core 34 has a width that varies from a width dimension W3 to a width dimension W4 at the intersection with the output section 38. The width dimensions W3, W4 may differ with the width dimension W4 being greater than the width dimension W3 such that the width increases with decreasing distance from the output section 38. In an embodiment, the width of the tapered section 36 may vary over its length based on a linear function to provide a trapezoidal shape. In an alternative embodiment, the width of the tapered section 36 may vary with a curvature over its length based on a non-linear function, such as a quadratic, cubic, parabolic, sine, cosine, Bezier, or exponential function. The width of the tapered section 36 and the width of the tapered section 24 of the waveguide core 12 longitudinally vary in opposite directions. In that regard, the tapered section 36 defines an inverse taper characterized by a gradual increase in width along a direction of mode propagation.

The tapered section 36 of the waveguide core 34 is diagonally positioned relative to the tapered section 24 of the waveguide core 12. The diagonal offset is provided by a lateral offset D1 in a lateral direction and a vertical offset D2 in a vertical direction that is transverse to the lateral direction. The lateral offset D1 may be measured between the sidewall 42 of the tapered section 36 and the sidewall 28 of the tapered section 24. The vertical offset D2 may be measured between the bottom surface 43 of the tapered section 36 and the top surface 29 of the tapered section 24. The lateral offset D1 is chosen such that the tapered section 24 and the tapered section 36 have a non-overlapping relationship. In an embodiment, the lateral offset D1 may range from about 50 nanometers (nm) to about 3000 nm. In an embodiment, the vertical offset D2 may range from about 1 nm to about 3000 nm. During use, light may be evanescently coupled in a diagonal direction between the tapered section 24 of the waveguide core 12 and the tapered section 36 of the waveguide core 34.

Figure 5:
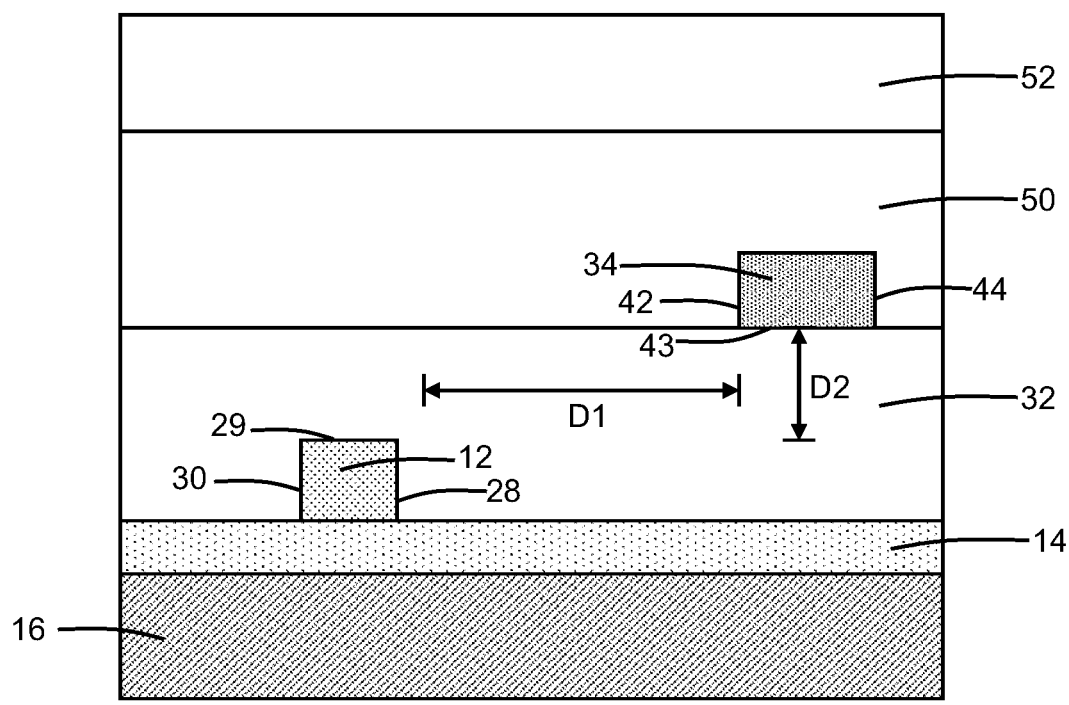
FIG. 5 is a cross-sectional view of the structure at a fabrication stage subsequent to FIG. 4.

With reference to FIG. 5 in which like reference numerals refer to like features in FIG. 4 and at a subsequent fabrication stage, a dielectric layer 50 is formed over the waveguide core 34. The dielectric layer 50 may be comprised of a dielectric material, such as silicon dioxide, that provides low-index cladding. The thickness of the dielectric layer 50 may be greater than the thickness of the waveguide core 34 such that the waveguide core 34 is embedded in the dielectric layer 50.

A back-end-of-line stack 52 may be formed by back-end-of-line processing over the dielectric layer 50. The back-end-of-line stack 52 may include one or more interlayer dielectric layers each comprised of a dielectric material, such as silicon dioxide or silicon nitride.

The structure 10, in any of its embodiments described herein, may be integrated into a photonics chip that includes electronic components and additional optical components. The electronic components may include, for example, field-effect transistors that are fabricated by complementary-metal-oxide-semiconductor (CMOS) processing using the device layer of the silicon-on-insulator substrate. The back-end-of-line stack 52 may include metal lines, vias, and contacts that are connected to the field-effect transistors and electrically-active optical components.

In use, light may be guided on the photonics chip by the waveguide core 12 to the structure 10. The light may be evanescently coupled from the tapered section 24 of the waveguide core 12 to the tapered section 36 of the waveguide core 34. Evanescent coupling occurs in a lateral direction due to the offset and in a vertical direction due to the orthogonal offsets D1, D2 between the waveguide core 12 and the waveguide core 34. The diagonal mode conversion of the transferred light may be adiabatic with low loss. The transferred light exits the structure 10 through the output section 38 of the waveguide core 34 to be further guided on the photonics chip to a downstream destination. Any residual light exiting the coupling region 25 guided by the waveguide core 12 is absorbed by the terminator 22.

The structure 10 leverages waveguide cores 12, 34 that contain different materials and that are placed diagonally in different levels (in elevation) to provide adiabatic coupling of the transferred light from the waveguide core 12 to the waveguide core 34. The non-overlapping arrangement of the waveguide core 34 relative to the waveguide core 12 may be effective for efficiently transferring light with either transverse electric (TE) polarization mode or transverse magnetic (TM) polarization mode from the waveguide core 12 to the waveguide core 34. In particular, the transfer of light with TM polarization mode may occur with minimal perturbation because of the lateral offset of the waveguide core 34 relative to the waveguide core 12. The structure 10 may exhibit a low insertion loss for either polarization mode, as well as have a more compact footprint, in comparison with conventional constructions for an optical coupler.

Figure 6:
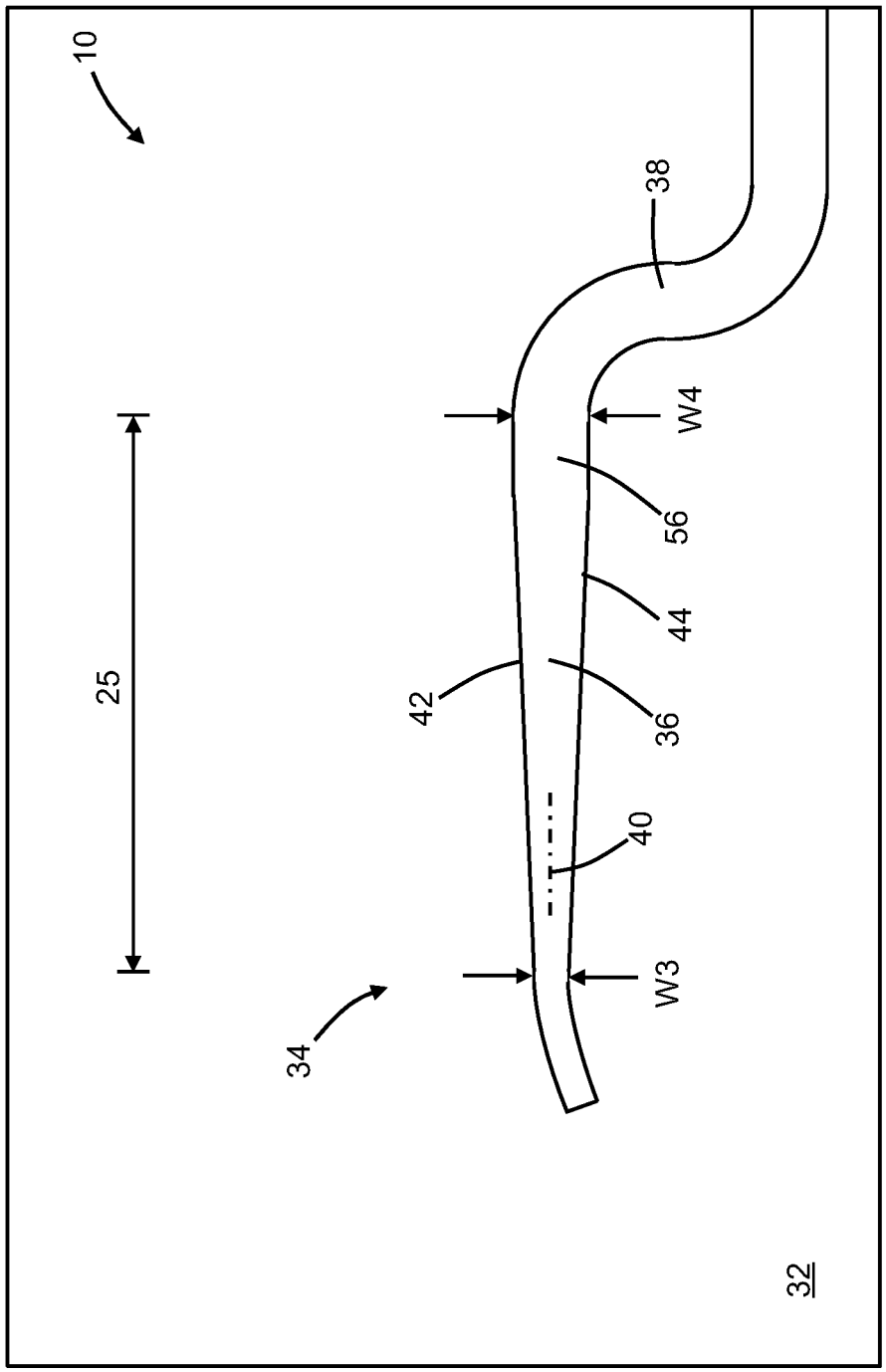
FIGS. 6-9 are top views of structures in accordance with alternative embodiments of the invention.

With reference to FIG. 6 in which like reference numerals refer to like features in FIG. 3 and in accordance with alternative embodiments of the invention, a section 56 may be added to the waveguide core 34 in order to define a multiple-stage optical coupler.

Figure 7:
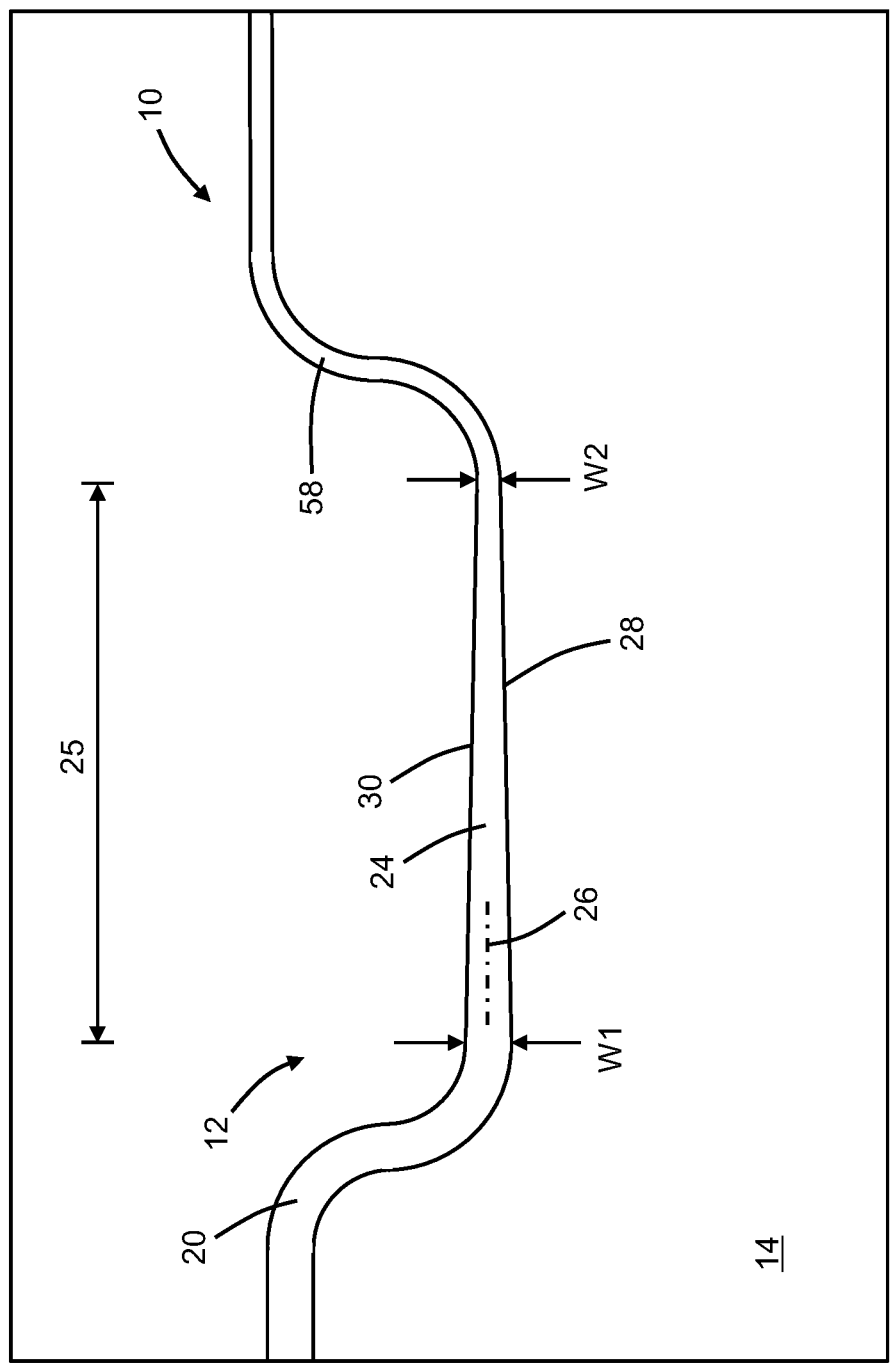

With reference to FIG. 7 in which like reference numerals refer to like features in FIG. 1 and in accordance with alternative embodiments of the invention, the terminator 22 of the waveguide core 12 may be replaced by an output section 58. The output section 58 may include a series of bends that laterally displace the routing of the tapered section 24 of the waveguide core 12. The output section 38 of the waveguide core 34 and the output section 58 of the waveguide core 12 contribute to laterally displacing the waveguide core 34 relative to the waveguide core 12 such that light coupling ceases and cross-talk does not occur outside of the coupling region 25.

The structure 10 may be used as an optical splitter in which a fraction of the light arriving through the input section 20 of the waveguide core 12 is coupled from the tapered section 24 to the tapered section 36 of the waveguide core 34, and another fraction of the arriving light continues to propagate in the tapered section 24 into the terminator 22 and exits the structure 10. A coupling ratio, such as a 50%-50% coupling ratio that provides an even split of the light, may be attained through selection of the orthogonal offsets D1, D2, the length of the coupling region 25, the widths W1, W2 of the tapered section 24, the widths W3, W4 of the tapered section 36, and other parameters relating to the waveguide cores 12, 34.

Figure 8:
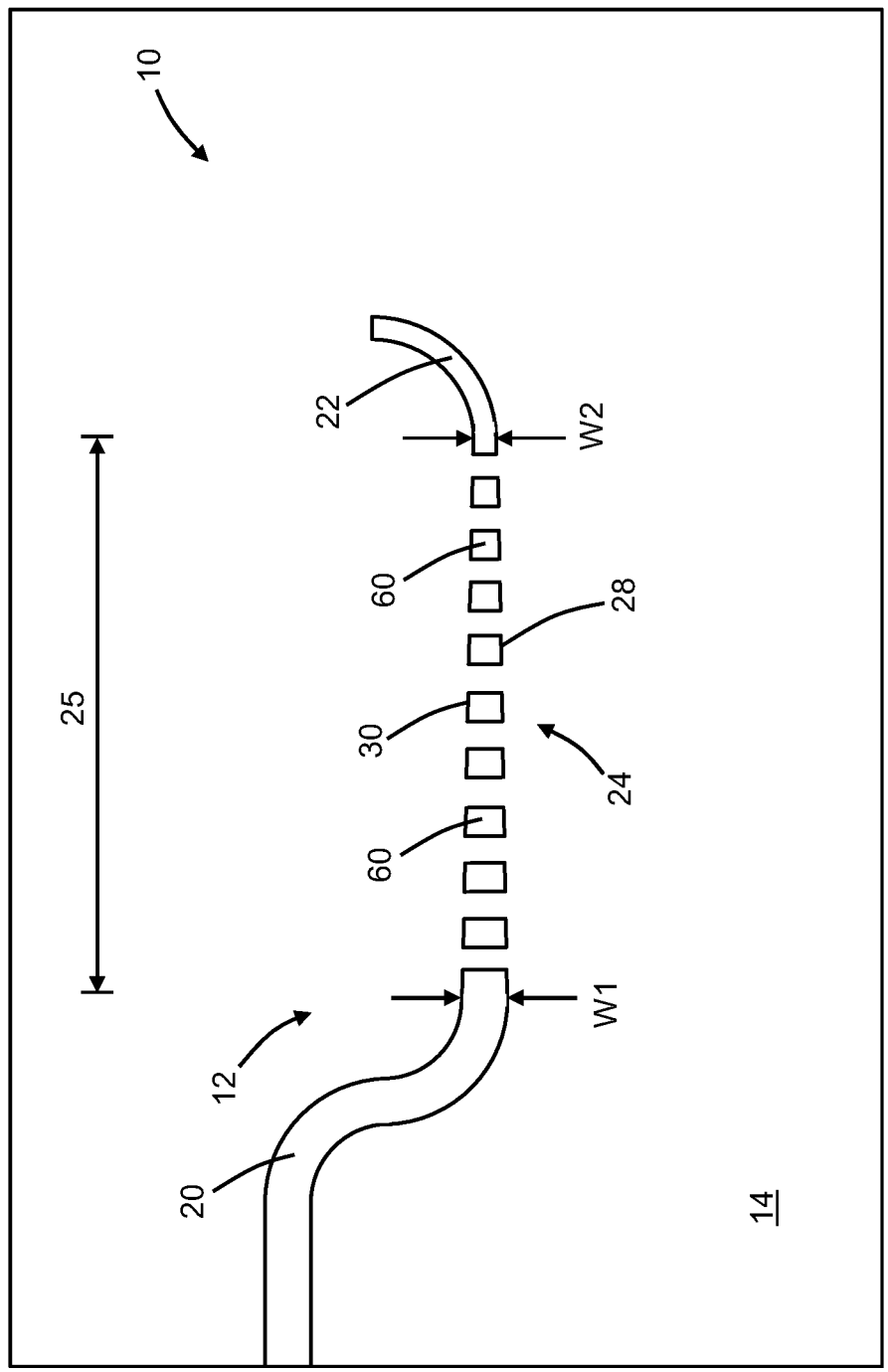

With reference to FIG. 8 in which like reference numerals refer to like features in FIG. 1 and in accordance with alternative embodiments of the invention, the tapered section 24 of the waveguide core 12 may be segmented into discontinuous portions to define grating features 60 of a grating that are separated by intra-segment spaces. Portions of the dielectric material of the dielectric layer 32 fill the spaces between the grating features 60. The grating features 60 are contained within an envelope with a tapering described by the tapering of the unsegmented tapered section 24. The individual grating features 60 may have a trapezoidal shape.

The grating features 60 of the tapered section 24 may define a subwavelength grating. When the wavelength of the light propagating within the tapered section 24 is greater than the feature size of the grating features 60, the grating features 60 and the dielectric layer 32 in the spaces between the grating features 60 can be treated as an effective homogeneous material with an effective refractive index between the refractive index of the material constituting the grating features 60 and the refractive index of the dielectric material filling the spaces between the grating features 60. For example, the wavelength of the light received by the structure 10 may be within a band ranging from 1260 nm to 1360 nm (i.e., the O-band), and the feature size of the grating features 60 may be less than the lower limit of the wavelength band.

Figure 9:
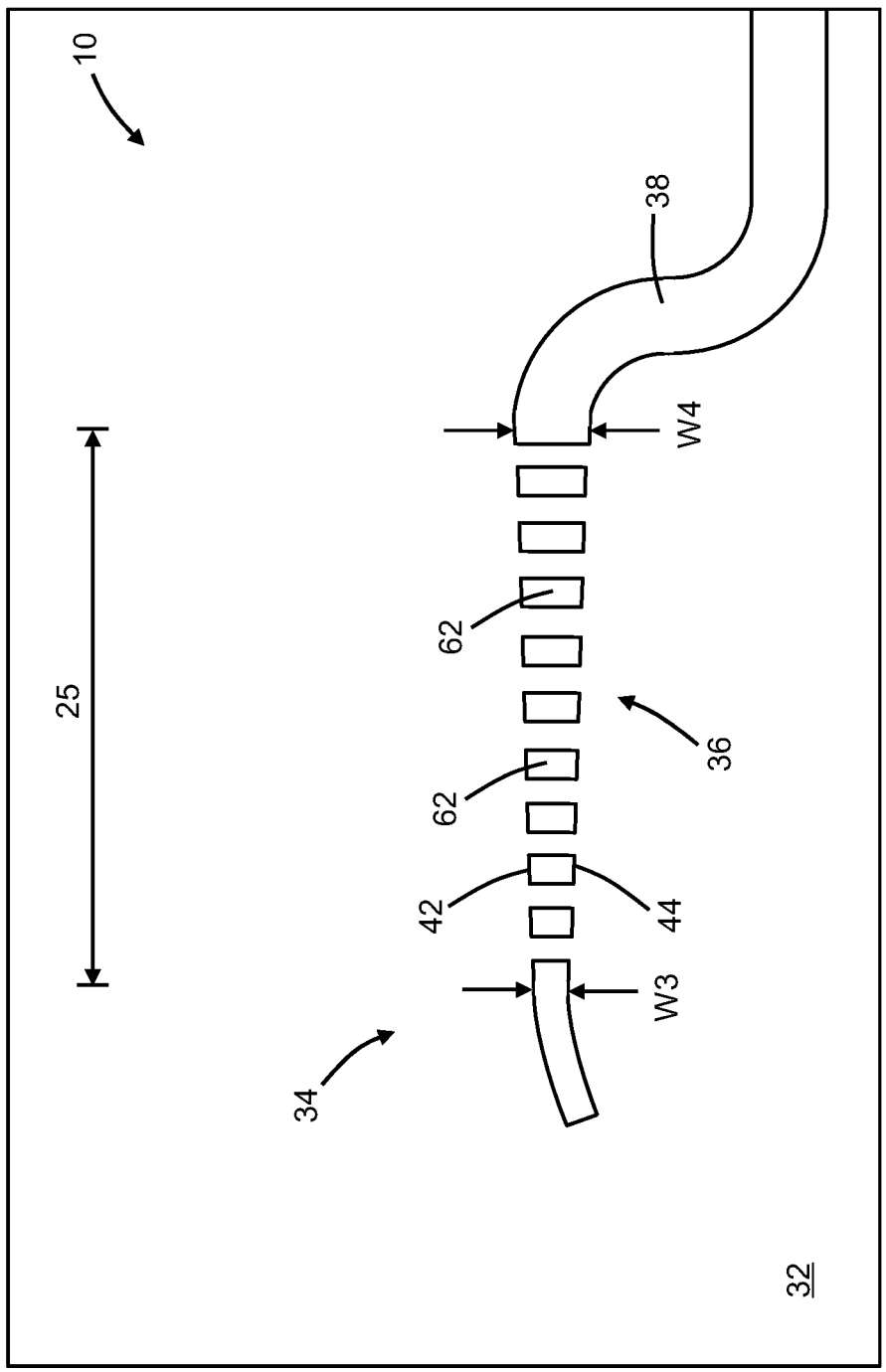

With reference to FIG. 9 in which like reference numerals refer to like features in FIG. 3 and in accordance with alternative embodiments of the invention, the tapered section 36 of the waveguide core 34 may be segmented into discontinuous portions to define grating features 62 of a grating that are separated by intra-segment spaces. Portions of the dielectric material of a subsequently-deposited interlayer dielectric layer of the back-end-of-line stack 52 (FIG. 5) fill the spaces between the grating features 62. The grating features 62 are contained within an envelope with a tapering described by the tapering of the unsegmented tapered section 36. The individual grating features 62 may have a trapezoidal shape.

The grating features 62 of the tapered section 36 may define a subwavelength grating. When the wavelength of the light propagating within the tapered section 36 is greater than the feature size of the grating features 62, the grating features 62 and the dielectric material in the spaces between the grating features 62 can be treated as an effective homogeneous material with an effective refractive index between the refractive index of the material constituting the grating features 62 and the refractive index of the dielectric material filling the spaces between the grating features 62. For example, the wavelength of the light received by the structure 10 may be within a band ranging from 1260 nm to 1360 nm, and the feature size of the grating features 62 may be less than the lower limit of the wavelength band.

In embodiments, the structure 10 may include the segmented tapered section 36 in combination with either the unsegmented tapered section 24 or the segmented tapered section 24.

Figure 10:
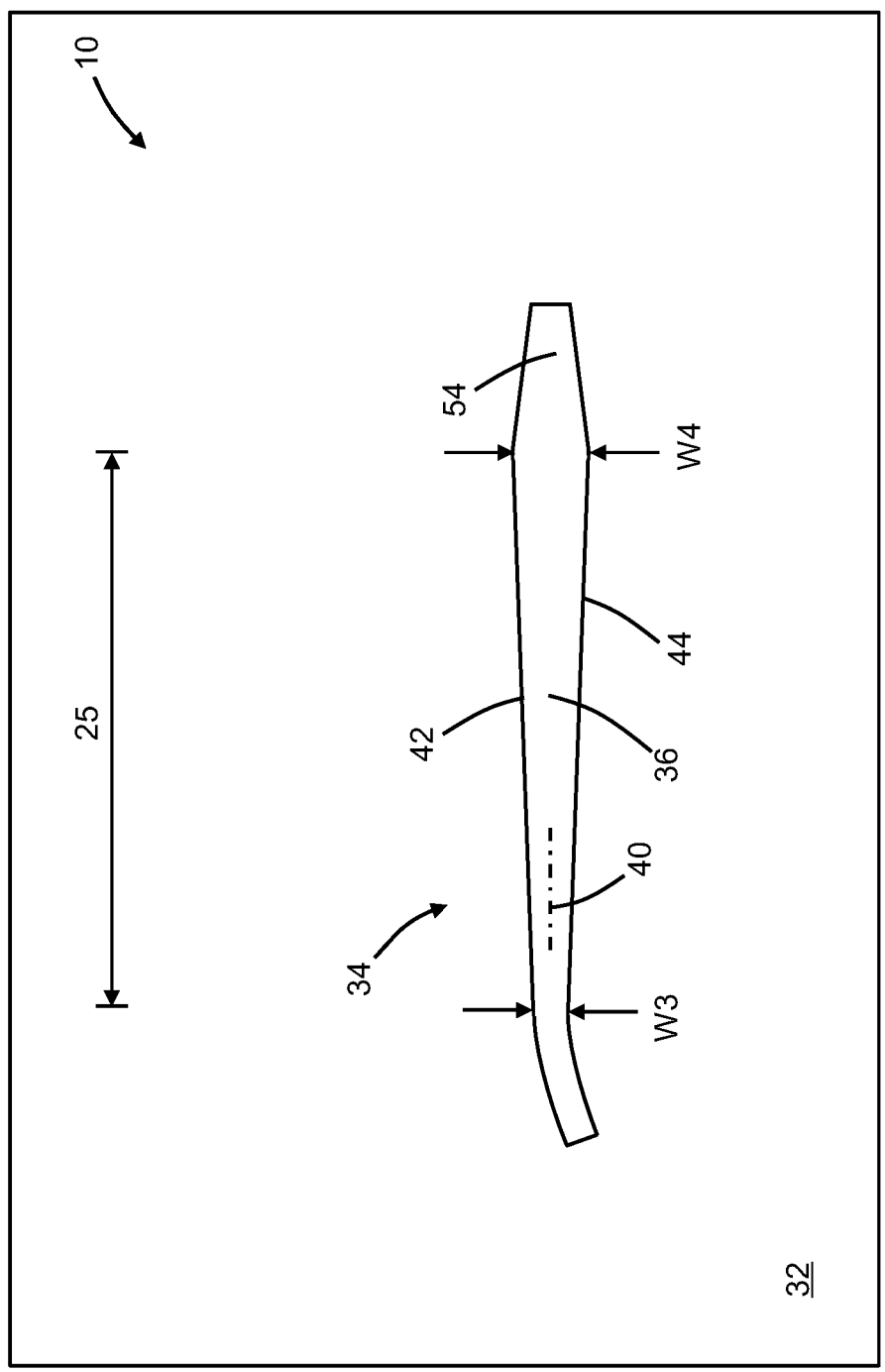
FIG. 10 is a top view of a structure at a fabrication stage of a processing method in accordance with alternative embodiments of the invention.

With reference to FIG. 10 in which like reference numerals refer to like features in FIG. 3 and in accordance with alternative embodiments of the invention, the waveguide core 34 may be modified to terminate with a taper 54 instead of the output section 38.

Figure 11:
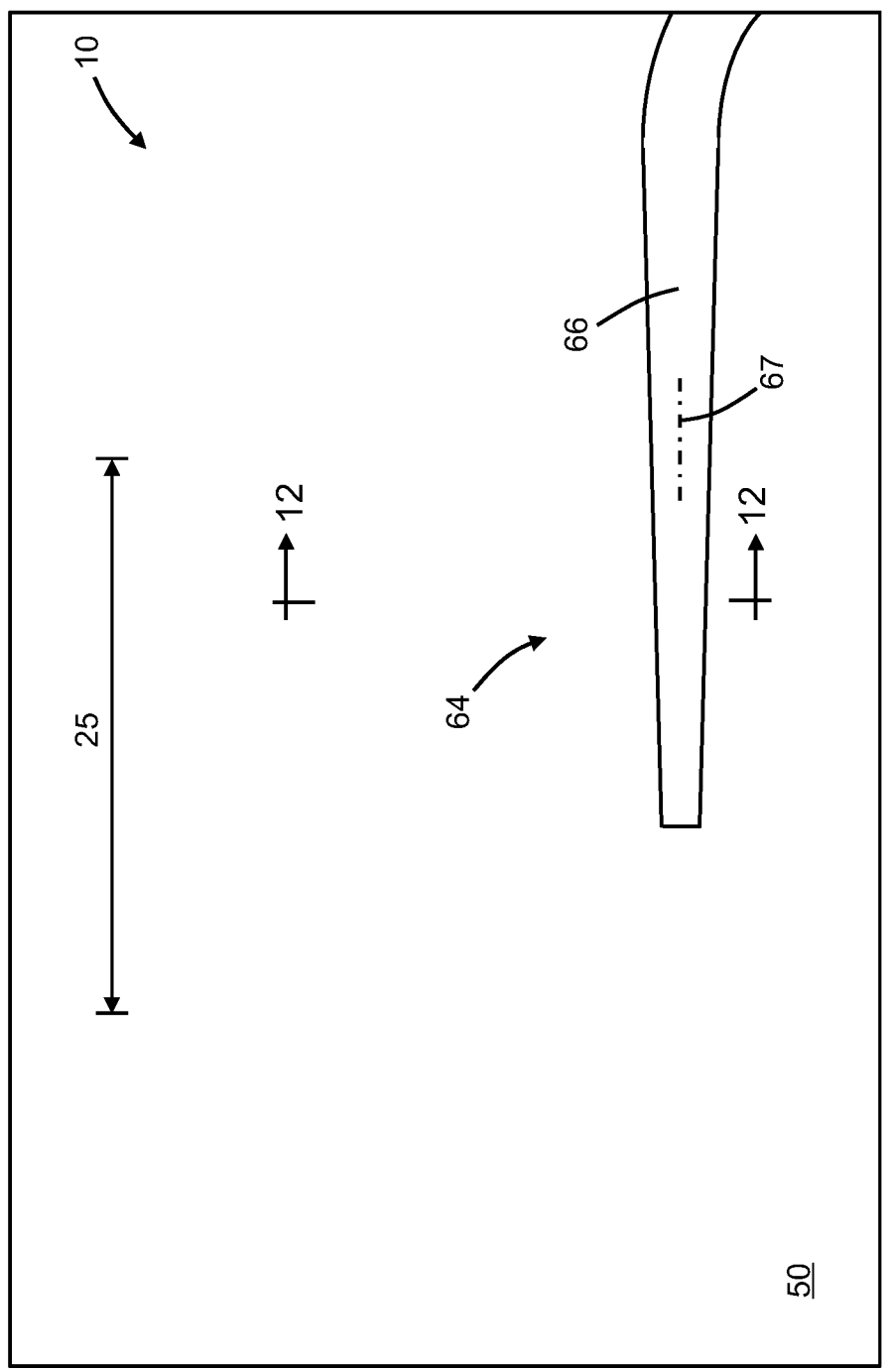
FIG. 11 is a top view of the structure at a fabrication stage subsequent to FIG. 10.
Figure 12:
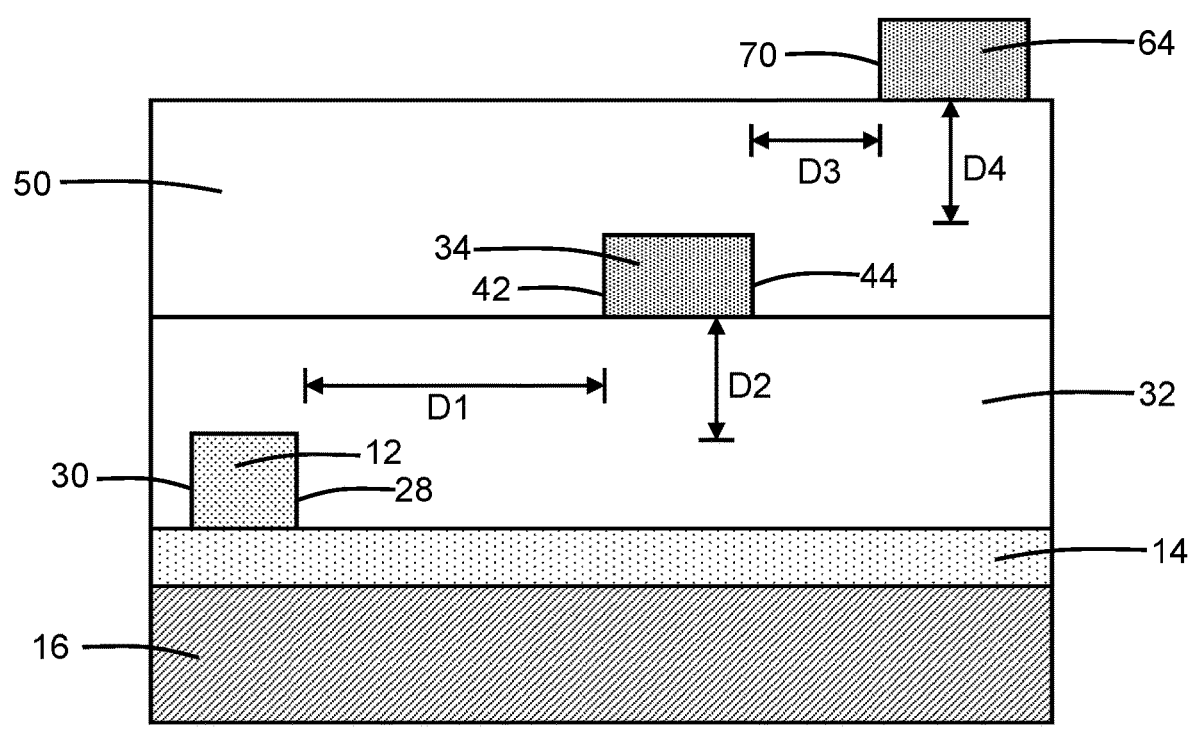
FIG. 12 is a cross-sectional view taken generally along line 12-12 in FIG. 11.

With reference to FIGS. 11, 12 in which like reference numerals refer to like features in FIG. 10 and at a subsequent fabrication stage, the dielectric layer 50 is formed over the waveguide core 34, and a waveguide core 64 may be formed on the dielectric layer 50 to provide a multiple-level arrangement. The waveguide core 64 includes a tapered section 66 that is positioned adjacent to the tapered section 36 of the waveguide core 34 and an output section 68 having multiple bends. The tapered section 66 may be aligned along a longitudinal axis 67, which may be oriented parallel to the longitudinal axis 40 of the waveguide core 34. The dielectric layer 50 is arranged to separate the tapered section 66 from the tapered section 36. The tapered section 36 and the tapered section 66 may taper in opposite directions. The waveguide core 64 may be comprised of a dielectric material, such as silicon nitride, and may have the same composition as the material constituting the waveguide core 34. The waveguide core 64 may be patterned from a deposited layer of the dielectric material by lithography and etching processes.

The tapered section 66 of the waveguide core 64 has a diagonal offset relative to the tapered section 36 of the waveguide core 34. The tapered section 66 of the waveguide core 64 is diagonally positioned relative to the tapered section 36 of the waveguide core 34 with a lateral offset D3 in a lateral direction and a vertical offset D4 in a vertical direction that is transverse to the lateral direction. The lateral offset D3 may be measured between the sidewall 44 of the waveguide core 34 that is closest to a sidewall 70 of the waveguide core 64. The vertical offset D4 may be measured between a top surface of the tapered section 36 of the waveguide core 34 and a bottom surface of the tapered section 66 of the waveguide core 64. The lateral offset D3 eliminates any overlap between the tapered section 36 of the waveguide core 34 and the tapered section 66 of the waveguide core 64 such that the tapers have a non-overlapping relationship. In an embodiment, the lateral offset D3 may range from about 50 nm to about 3000 nm. In an embodiment, the vertical offset D4 may range from about 1 nm to about 3000 nm.

During use, light may be evanescently coupled in a diagonal direction from the tapered section 24 of the waveguide core 12 to the tapered section 36 of the waveguide core 34, and then evanescently coupled in a diagonal direction from the tapered section 36 of the waveguide core 34 to the tapered section 66 of the waveguide core 64 for output from the structure 10 through the output section 68 of the waveguide core 64. The diagonal offsets may assist with the efficient diagonal transfer of light with, for example, the TM polarization mode from the tapered section 24 to the tapered section 36 and from the tapered section 36 to the tapered section 66 in order to be guided away from the structure 10 by the waveguide core 64.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate a range of +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction perpendicular to the horizontal, as just defined. The term "lateral" refers to a direction within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present. Different features "overlap" if a feature extends over, and covers a part of, another feature.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure for an optical coupler, the structure comprising:
   a first waveguide core having a first tapered section; and
   a second waveguide core having a second tapered section positioned adjacent to the first tapered section of the first waveguide core, the second tapered section positioned with a first lateral offset in a lateral direction relative to the first tapered section, and the second tapered section positioned with a first vertical offset in a vertical direction relative to the first tapered section.

2. The structure of claim 1 wherein the first tapered section includes a first longitudinal axis and a first plurality of segments positioned with a first spaced arrangement along the first longitudinal axis.

3. The structure of claim 2 wherein the first plurality of segments define a subwavelength grating.

4. The structure of claim 2 wherein the second tapered section includes a second longitudinal axis and a second plurality of segments positioned with a second spaced arrangement along the second longitudinal axis.

5. The structure of claim 1 wherein the second tapered section includes a longitudinal axis and a plurality of segments positioned with a spaced arrangement along the longitudinal axis.

6. The structure of claim 5 wherein the plurality of segments define a subwavelength grating.

7. The structure of claim 1 further comprising:
   a third waveguide core having a third tapered section positioned adjacent to the second tapered section, the third tapered section positioned with a second lateral offset in the lateral direction relative to the second tapered section of the second waveguide core, and the third tapered section positioned with a second vertical offset in the vertical direction relative to the second tapered section of the second waveguide core.

8. The structure of claim 7 wherein the first tapered section and the second tapered section are non-overlapping due to the first lateral offset, and the second tapered section and the third tapered section are non-overlapping due to the second lateral offset.

9. The structure of claim 1 wherein the first waveguide core comprises silicon, and the second waveguide core comprises silicon nitride.

10. The structure of claim 1 further comprising:
    a first dielectric layer arranged to separate the first tapered section from the second tapered section,
    wherein the first tapered section is embedded in the first dielectric layer.

11. The structure of claim 1 wherein the first tapered section and the second tapered section have a non-overlapping relationship due to the first lateral offset.

12. The structure of claim 1 wherein the first waveguide core includes an input section and a terminator, the first tapered section is arranged between the input section and the terminator, the second waveguide core includes an output section connected to the second tapered section, and the output section includes a plurality of bends arranged to laterally displace the second waveguide core away from the first waveguide core.

13. The structure of claim 1 wherein the first waveguide core includes an input section and a first output section, the first tapered section is arranged between the input section and the first output section, the second waveguide core includes a second output section connected to the second tapered section, and the first output section and the second output section each include a plurality of bends arranged to laterally displace the second waveguide core away from the first waveguide core.

14. The structure of claim 1 wherein the first tapered section has a first longitudinal axis and narrows in width in a first direction along the first longitudinal axis, the second tapered section has a second longitudinal axis aligned parallel to the first longitudinal axis and narrows in width in a second direction along the second longitudinal axis, and the first direction is opposite to the second direction.

15. A method of forming a structure for an optical coupler, the method comprising:

forming a first waveguide core that includes a first tapered section; and forming a second waveguide core that includes a second tapered section positioned adjacent to the first tapered section, wherein the second tapered section is positioned with a lateral offset in a lateral direction relative to the first tapered section of the first waveguide core, and the second tapered section is positioned with a vertical offset in a vertical direction relative to the first tapered section of the first waveguide core.

16. The method of claim 15 wherein the first waveguide core is formed by patterning a first layer comprised of a semiconductor material, and the second waveguide core is formed by patterning a second layer comprised of a dielectric material.

17. The method of claim 15 wherein forming the first waveguide core that includes the first tapered section comprises:

forming a plurality of segments positioned with a spaced arrangement to define the first tapered section.

18. The method of claim 15 wherein forming the second waveguide core that includes the second tapered section positioned adjacent to the first tapered section comprises:

forming a plurality of segments positioned with a spaced arrangement to define the second tapered section.

19. The method of claim 15 wherein the first tapered section and the second tapered section have a non-overlapping relationship due to the lateral offset.

20. The structure of claim 1 wherein the first tapered section is located adjacent to the second tapered section over a coupling region, and the first lateral offset and the first vertical offset diagonally position the first tapered relative to the second tapered section such that light is evanescently coupled in a diagonal direction across the coupling region between the first tapered section and the second tapered section.

* * * * *